(12) United States Patent
Jolliffe et al.

(10) Patent No.: US 8,900,357 B2
(45) Date of Patent: Dec. 2, 2014

(54) FILTER ELEMENT AND AIR FILTER

(75) Inventors: Paul Jolliffe, Craven Arms Shropshire (GB); Hendrik Von Merkatz, Remseck (DE)

(73) Assignee: Mahle International GmbH (DE)

( * ) Notice: Subject to any disclaimer, the term of this patent is extended or adjusted under 35 U.S.C. 154(b) by 218 days.

(21) Appl. No.: 13/514,247

(22) PCT Filed: Nov. 30, 2010

(86) PCT No.: PCT/EP2010/068515
§ 371 (c)(1),
(2), (4) Date: Aug. 17, 2012

(87) PCT Pub. No.: WO2011/069864
PCT Pub. Date: Jun. 16, 2011

(65) Prior Publication Data
US 2012/0312172 A1    Dec. 13, 2012

(30) Foreign Application Priority Data
Dec. 7, 2009   (DE) .................. 20 2009 016 500 U

(51) Int. Cl.
| | | |
|---|---|---|
| *B01D 46/00* | (2006.01) | |
| *B01D 46/24* | (2006.01) | |
| *B01D 46/52* | (2006.01) | |
| *F02M 35/024* | (2006.01) | |
| *F02M 35/02* | (2006.01) | |

(52) U.S. Cl.
CPC .......... *B01D 46/2414* (2013.01); *B01D 46/523* (2013.01); *B01D 2279/60* (2013.01); *F02M 35/024* (2013.01); *F02M 35/0203* (2013.01); *B01D 2201/4046* (2013.01)

USPC .............. 96/422; 55/385.3; 55/498; 55/502; 55/521; 123/198 E

(58) Field of Classification Search
USPC ................ 55/357, 385.3, 498, 502, 521; 123/198 E; 60/39.092
See application file for complete search history.

(56) References Cited

U.S. PATENT DOCUMENTS

| | | |
|---|---|---|
| 6,949,155 B1 | 9/2005 | Lang et al. |
| 2003/0131925 A1* | 7/2003 | Hedlund et al. ............... 156/205 |
| 2008/0209875 A1* | 9/2008 | Treier et al. ...................... 55/498 |
| 2009/0249754 A1* | 10/2009 | Amirkhanian et al. .......... 55/357 |
| 2011/0192126 A1* | 8/2011 | Volkmann ......................... 55/502 |
| 2011/0277442 A1* | 11/2011 | Drobniak ................... 60/39.092 |
| 2014/0033668 A1* | 2/2014 | Kleynen ........................... 55/502 |

FOREIGN PATENT DOCUMENTS

| | | |
|---|---|---|
| DE | 202008010504 U1 | 12/2009 |
| WO | WO-2008/157251 A2 | 12/2008 |
| WO | WO-2009014982 A1 | 1/2009 |

* cited by examiner

*Primary Examiner* — Duane Smith
*Assistant Examiner* — Minh-Chau Pham
(74) *Attorney, Agent, or Firm* — Rader, Fishman & Grauer PLLC

(57) ABSTRACT

A filter element of a fresh air system of an internal combustion engine may include an annular filter body having a folded filter material and at least one end disc fastened to an axial end face of the filter body on the filter material. The filter material may have two end folds adjacent in the circumferential direction and be fastened to each other. The at least one end disc may have at least one alignment contour protruding at least one of radially and axially from a respective one of the at least one end disc.

19 Claims, 2 Drawing Sheets

FILTER ELEMENT AND AIR FILTER

CROSS-REFERENCE TO RELATED APPLICATIONS

This application claims priority to German Patent Application 20 2009 016 500.0 filed on Dec. 7, 2009 and PCT/EP2010/068515 filed on Nov. 30, 2010, which are hereby incorporated by reference in their entireties.

TECHNICAL FIELD

The present invention relates to a filter element, in particular for an air filter of a fresh air system of an internal combustion engine. The invention further relates to an air filter for a fresh air system of an internal combustion engine, in particular in a road vehicle.

BACKGROUND

An air filter can basically have a filter housing, in which a filter element is arranged and thereby separates a raw side from a clean side in the filter housing. The filter element here can have an annular filter body of a folded filter material. The folded or pleated filter material here has two end folds or end sections, which are adjacent in the circumferential direction of the annular filter body and are fastened to each other. For fastening the two end folds to each other, it is basically possible to glue the end folds to each other or to weld them to each other or to fasten them to each other by means of at least one clip.

Owing to the fastening of the end folds to each other, the filter body has in the region of the end folds which are fastened to each other a different, namely an increased, through-flow resistance than in the other regions, because the end folds which are fastened to each other lead there to a certain sealing of the filter material. In this respect, a non-homogeneous distribution of the through-flow resistance is produced in circumferential direction of the filter body.

In particular applications, a symmetrical flow pattern downstream of the filter element can be significant. For example, in a fresh air system downstream of the filter element an air-flow sensor, in particular in the form of a hot film sensor, can be arranged in order to detect for example the currently flowing air quantity for an engine control. If for any reason it is necessary to position this air-flow sensor relatively close to the filter element, the relative rotational position of the filter element in the filter housing can have an influence on the measurement of the air-flow sensor. In order to reduce the influence of the rotational position of the filter element on the air-flow measurement, it is possible to calibrate the air-flow sensor only with an installed filter element. This may still be able to be realized with justifiable expenditure on the initial equipping of a vehicle, but not for the case where the filter element is exchanged within an inspection. The newly inserted filter element then regularly has a different relative rotational position with respect to the filter housing and therefore also with respect to the air-flow sensor, which makes a renewed calibration of the air-flow sensor necessary. The expenditure for this is comparatively high and can, in particular, exceed the material costs for the new filter element and the labour costs for the exchange of the filter element.

SUMMARY

The present invention deals with the problem of indicating an improved embodiment for an air filter or respectively for an associated filter element, which is distinguished in particular in that the expenditure for the mounting or respectively for the maintenance is reduced. In particular, the above-mentioned disadvantages are to be eliminated.

This problem is solved according to the invention by the subjects of the independent claims. Advantageous embodiments are the subject of the dependent claims.

The invention is based on the general idea of providing at least on an axial end disc of the filter element at least one alignment contour, which protrudes radially and/or axially from the respective end disc. In a complementary manner to this, the filter housing has at least one alignment counter-contour, which cooperates with the alignment contour of the filter element such that the filter element can be inserted correctly into the filter housing with respect to its longitudinal central axis exclusively in a predetermined rotational position. In this way, it is guaranteed that the filter element is always positioned with the same rotational position in the filter housing. As a result, even in the case of an exchange of the filter element, the same relative position to the filter housing is always produced. The alignment contour is preferably arranged eccentrically on the end disc, therefore the necessary orientation or respectively position of the filter element in the filter housing on assembly is able to be detected or respectively aligned with the naked eye. In other configurations, two or more alignment contours and alignment counter-contours are provided, which are arranged distributed in the circumferential direction on the end disc in a non-rotationally symmetrical pattern, e.g. in a Y-shape. Therefore, the filter element can also be inserted in the required position if one of the alignment contours was damaged. In particular, the alignment contours can have different dimensions and/or geometries, so that only the "correct" alignment contour can be inserted into the alignment counter-contour provided for this.

The alignment counter-contour can be constructed exclusively in one of the housing parts. In other configurations, the alignment counter-contour can also be provided in both housing parts. Here, each housing part then has a partial geometry of the alignment counter-contour and then the two housing parts together form the alignment counter-contour. It is advantageous if the alignment counter-contour lies here in the mould parting plane. Therefore, the necessary geometries can be realized free of undercut.

Expediently, provision can be made to position the alignment contour and the end folds, which are fastened to each other, relative to each other on producing the filter element so that the alignment contour and the end folds form an angle in circumferential direction which lies in a predetermined angle range. The predetermined angle range is comparatively narrow. In particular, the limits of this angle range can be a maximum of 20° or a maximum of 15° or a maximum of 10° distant from each other. Likewise, the angle between alignment contour and the end folds can have a predetermined angle which, however, is subject to certain fluctuations due to tolerance and accordingly likewise lies in an angle range. The predetermined angle can, in particular, also have the value of 0°, so that the alignment contour and the end folds are aligned flush to each other. Furthermore, any value between 0° and 360° is conceivable for the angle, preferably 90° or 135° or 180°.

Through this procedure, for each filter element necessarily the same or at least a very similar angular alignment is produced between the alignment contour and the end folds of the filter material which are fastened to each other. Hereby, it is achieved that also in the case of an exchange of the filter element, downstream thereof always the same or very similar flow conditions occur. In particular, in the case of an air-flow sensor arranged relatively close to the filter element, a renewed calibration can be dispensed with in the case of an exchange of the filter element. Likewise, it is also possible on an initial mounting to incorporate an already calibrated air-flow sensor, because the rotational position with which the filter element is arranged in the air filter housing can be selected in a systematic manner through the correlation between the position of the end folds and the position of the alignment contour, so that the influence of the non-homogeneous through-flow of the filter body on the air-flow sensor is reduced or respectively minimized, or can already be taken into consideration previously through an adaptation of the calibration to the known installation position of the filter element.

According to another advantageous embodiment, the alignment contour can be formed by an alignment projection protruding radially and axially outwards from the respective end disc. Here, the alignment contour can be formed integrally in particular on the respective end disc or can be applied securely thereon. The forming-on of an alignment projection can be taken into consideration in a particularly simple manner during the production of the respective end disc.

According to a further particularly advantageous embodiment, the end folds can be fastened to each other by at least one clip, wherein provision can be made expediently to produce the respective clip from metal, in particular from a magnetically detectable metal. Clips can be arranged comparatively simply on the end folds. Metallic clips can be separated simply from the plastic of the filter material and of the end discs on recycling of the filter elements. In particular, the metal clips remain on incineration of the filter elements. Magnetically detectable metals, in particular ferromagnetic metals, simplify an automatic alignment of the clipped end folds in the production of the filter elements with regard to the alignment contour of the respective end disc. In particular, the automatic manufacture can be thereby simplified.

The filter housing can be configured so that it completely surrounds the filter element. The alignment counter-contour is then formed in a corresponding filter element mount in the housing.

In an alternative embodiment, the filter element can have a closed end disc or can be provided with an open end disc, the opening of which is shut (tightly) with a cover. The filter housing can now be equipped with a housing opening complementary to this closed or shut end disc, which is shut (tightly), when the filter element is inserted correctly into the filter housing. Hereby, it is ensured that the fresh air system only functions correctly when precisely the filter element is installed which is designed for this fresh air system or respectively for this air filter. Therefore, the closed or respectively shut end disc forms a part of the filter housing surrounding the filter medium. Here, the entire end disc or a partial section or several partial sections of the end disc can be provided for the completion of the filter housing.

The respective end disc or the respective cover can be held by a form fit on the filter housing or respectively on the shell body which form the filter housing. For example, an opening rim, which surrounds the housing opening, can have at least partially a receiving groove which us U-shaped in profile, into which an outer rim of the end disc or respectively of the cover projects radially.

According to an advantageous configuration, the alignment contour with an inserted filter element is visible from the exterior. In particular, the alignment contour is arranged in the region of the end disc which is provided for the completion of the filter housing. By the use of the end disc as a housing part, the alignment contour is visible from the exterior with the naked eye. Therefore, the correct mounting of the correct filter element can be ascertained without additional means.

The end disc preferably has a sealing surface, on which a seal is produced between the filter element and the filter housing. This sealing surface can be formed on an axial end face of the end disc and can rest in a sealing manner against at least one of the two housing parts. Here, a plastic/plastic seal is sufficient, because it is irrelevant for the function of the air filter if small leakage flows of unfiltered air penetrate into the raw zone surrounding the filter element. In other configurations, a separate seal can also be provided, which prevents these leakage flows. This is necessary in particular when the region around the filter element is the clean side.

The corresponding sealing surface on the housing part or respectively on the housing parts can be provided in a receiving groove, into which the end disc of the filter element is inserted.

According to a further configuration of the invention, the alignment contour is configured as a mounting aid, in particular as a grip or ring, and thus facilitates the handling of the filter element on mounting/dismantling.

Further important features and advantages of the invention will be apparent from the subclaims, from the drawings and from the associated figure description with the aid of the drawings.

It is to be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
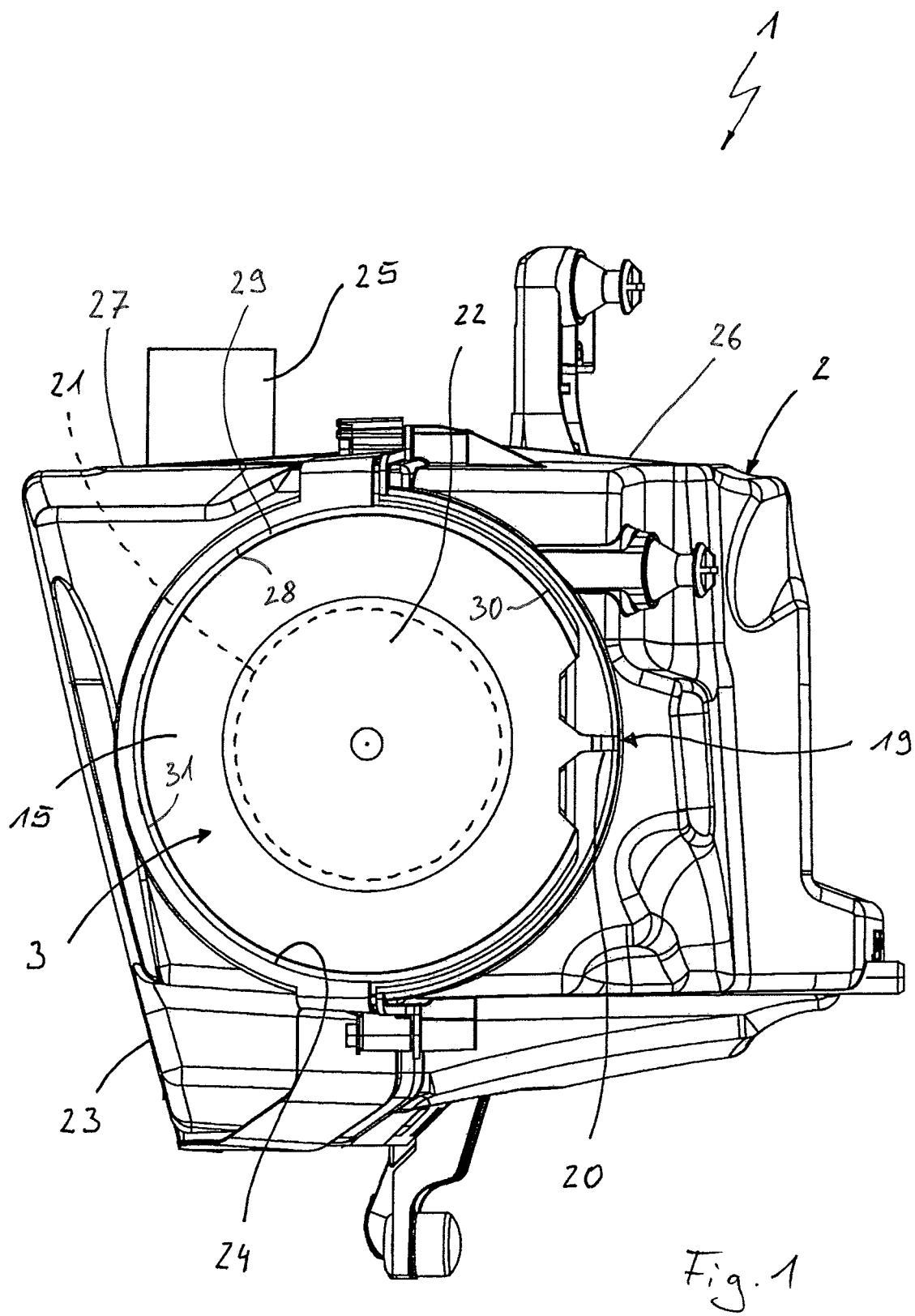
FIG. 1 a side view of an air filter,
FIG. 2 a side view of a filter element,
FIG. 3 an axial view, partially in section, of the filter element in accordance with a viewing direction III in FIG. 2,
FIG. 4 an enlarged detail IV of FIG. 2.

In accordance with FIG. 1, an air filter 1 for a fresh air system, not otherwise illustrated, of an internal combustion engine, which can be situated in particular in a road vehicle, comprises a filter housing 2. The filter housing 2 serves to receive a filter element 3, wherein the filter element 3 separates a raw side from a clean side in the filter housing 2 in a conventional manner. In the example, the filter housing 2 is constructed having several parts and comprises at least two shell bodies 26, 27, which are fastened to each other.

Figure 2:
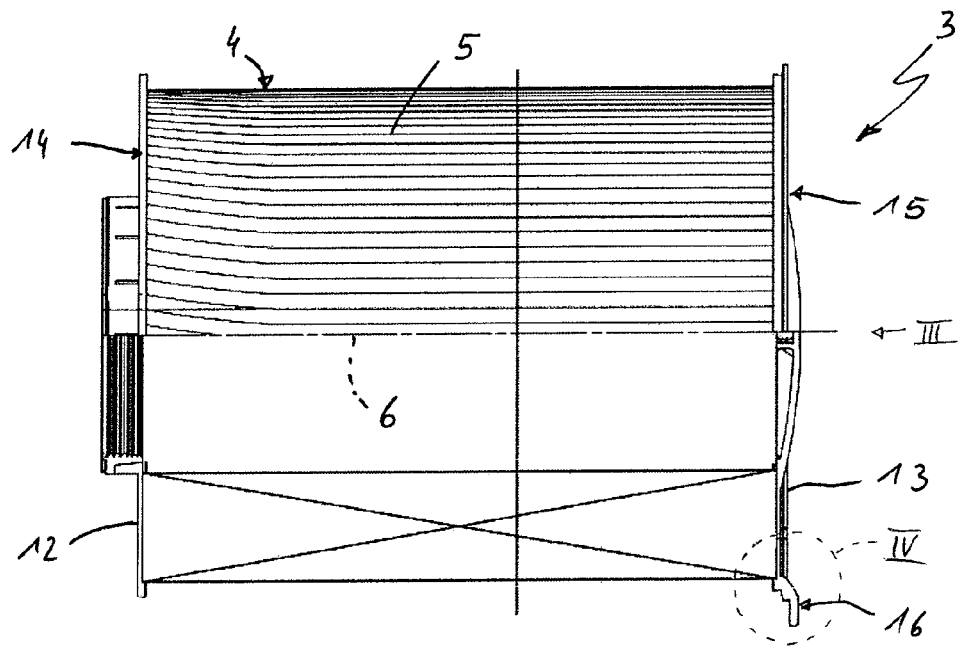
Figure 3:
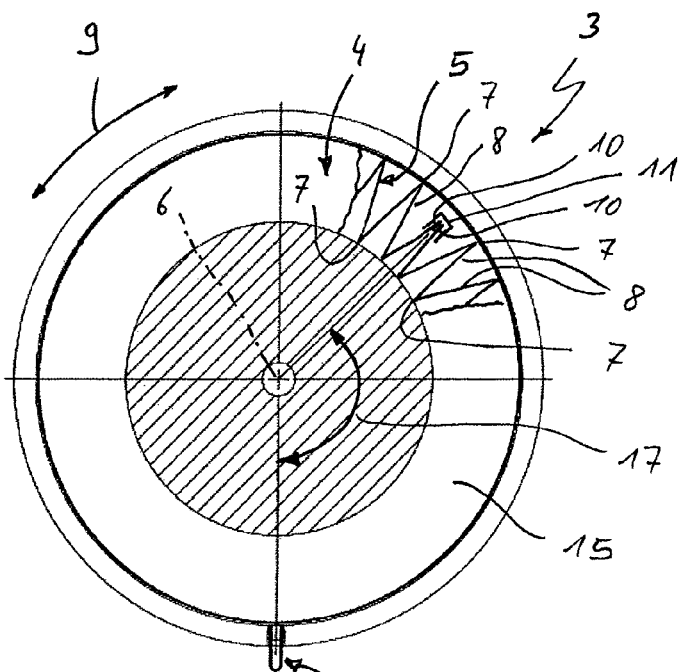
Figure 4:
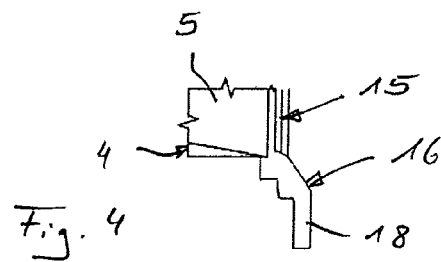

In accordance with FIGS. 2 to 4, the filter element 3, which can be used in the air filter 1, has a filter body 4 which is configured in an annular shape and consists of a folded filter material 5. The filter body 4 is configured in particular so as to be cylindrical and preferably circular-cylindrical. It has a longitudinal central axis 6 which is also the longitudinal central axis of the filter element 3.

The folded filter material 5 has a plurality of folds 7, wherein folds 7 lying internally with respect to the longitudinal central axis 6 and folds 7 lying externally alternate with each other. Flat sections 8 of the filter material 5 extend between the folds 7. The folds 7 extend substantially parallel to the longitudinal central axis 6, i.e. axially. In the circumferential direction of the filter body 4, which is indicated in FIG. 3 by a double arrow and is designated by 9, two end folds 10 or circumferential ends 10 or end sections 10 of the filter material 5 meet each other. These end folds 10 are adjacent in the circumferential direction 9. In addition, they are fastened to each other. In the example of FIG. 3, the two end folds 10 are fastened to each other by means of at least one clip 11. The clip 11 can extend over the entire axial length of the end folds 10. Likewise, it is possible to provide several clips 11 which are spaced apart from each other axially and are arranged distributed along the end folds 10. In addition or alternatively to the at least one clip 11, provision can be made to weld the end folds 10 to each other and/or to glue them to each other.

The filter element 3 has at its axial end faces 12, 13 in each case an end disc 14 or respectively 15. The respective end disc 14, 15 is fastened to the filter material 5. A plasticizing is preferred here, in which the filter material 5 dips into the plastic of the respective end disc 14, 15 and is embedded therein. Alternatively, a gluing or welding of the respective end disc 14, 15 with the filter material 5 can be provided.

At least one of the end discs 14, 15, here the end disc 15 shown on the right in FIG. 2, is equipped with at least one alignment contour 16. The alignment contour 16 protrudes radially or axially or both radially and axially from the respective end disc 15 with respect to the longitudinal central axis 6. The end disc 15, equipped with the alignment contour 16, is expediently arranged on the filter material 5 so that a predetermined rotational position relationship is produced between the alignment contour 16 and the end folds 10. According to FIG. 2, an angle 17 can be formed between the alignment contour 16 and the end folds 10 which are fastened to each other. This angle 17 corresponds here to a predetermined angle, which must be complied with on the arranging of the end disc 15. Owing to manufacturing tolerances, which make an exact complying with the predetermined angle difficult, the actually present angle 17 can deviate from the desired target angle within the framework of the manufacturing tolerances. Expediently therefore the actually present angle 17, i.e. the actual angle 17, lies in a predetermined angle range, which contains the previously mentioned predetermined target angle centrally, and the limits of which are a maximum of 20° distant from each other. In a preferred embodiment, the range limits of the predetermined angle range can be a maximum of 15° or in particular a maximum of 10° distant from each other.

The predetermined target angle can basically assume any value between 0° and 360°. An embodiment is preferred in which the target angle between the alignment contour 16 and the end folds 10 which are fastened to each other has the value of 0°. In other words, in this case the end folds 10 which are fastened to each other are aligned radially and/or axially with the alignment contour 16. In the example of FIG. 3, an angle 17 of approximately 135° is illustrated for representation purely by way of example.

In the example embodiment shown here, the alignment contour 16 is formed by a single alignment projection 18. The latter protrudes in the example both radially and axially outwards from the respective end disc 15. In another embodiment, an alignment projection 18 can also be provided protruding only radially from the end disc 15. Likewise, an embodiment is possible in which the alignment projection 18 protrudes only axially from the respective end disc 15.

In addition, an embodiment is also conceivable, in which the alignment contour 16 has more than one alignment projection 18. Instead of one alignment projection 18, the alignment contour 16 can also be equipped with at least one recess, which then corresponds to a negatively axially or respectively radially protruding contour.

The embodiment which is shown here, in which the alignment projection 18 protrudes both axially and radially from the end disc 15, is preferred. The alignment contour 16 can be added on to the respective end disc 15. An embodiment in which the alignment contour 16 is formed integrally on the respective end disc 15 is particularly advantageous.

In so far as, like here, the end folds 10 are fastened to each other with the aid of at least one clip 11, it can be expedient to produce the respective clip 11 from a metal or respectively to provide it with a metal body. Metallic clips are distinguished by a particularly high stability of shape, whereby it is possible to fasten the end folds 10 sufficiently tightly to each other exclusively by the pressing of the respective clip 11.

For the production of the filter element 3 which is presented here, it can be advantageous to select the metal of the clip 11 or respectively of the separate metal body arranged on the clip 11 which is made for example from plastic, such that the clip 11 or respectively the said metal body is magnetically detectable. In this way, with the aid of a corresponding sensor system, such as for example by means of a Hall sensor, the exact position of the clip 11 or respectively of the end folds 10 can be determined, whereby it is possible during the production of the filter element 3 to comply with the predetermined angle between the end folds 10 and the alignment contour 16 on arranging of the end disc 15 which is equipped with the alignment contour 16. In particular, the position of the end folds 10 can then be detected automatically with the aid of a corresponding machine, so that also the alignment between filter body 4 and end disc 15 can be carried out automatically.

In accordance with FIG. 1, the filter housing 2 is equipped with at least one alignment counter-contour 19, which is configured in a complementary manner to the alignment contour 16 of the filter element 3. On inserting of the filter element 3, the alignment contour 16 of the filter element 3 cooperates with the alignment counter-contour 19 of the filter housing 2 such that the filter element 3 can only be inserted in a predetermined rotational position correctly into the filter housing 2 in relation to its longitudinal central axis 6. In so far as the alignment contour 16 is equipped with an alignment projection 18, the alignment counter-contour 19 has a projection mount 20, shaped in a complementary manner to the alignment projection 18, into which the alignment projection 18 can engage in a form-fitting manner as soon as the filter element 3 has the desired rotational position.

In other embodiments, two or more alignment contours 16 and alignment counter-contours 19 complementary thereto can also be provided.

In the example of FIG. 1, the end disc 15 of the filter element 3, facing the observer, is configured as an open end disc 15, which extends in an annular manner around a central opening 21. In the example of FIG. 1 which is shown, this central opening 21 is closed with the aid of a cover 22, which is placed for example axially from the exterior onto the end disc 15 and is, in particular, clipped therewith. Provision can be made in particular here to provide a seal between the cover 22 and the end disc 15, in order to prevent a suction of excess air through the opening 21. Instead of an open end disc 15, the opening 21 of which is shut by a cover 22, a closed end disc 15 can also be used, which does not have a central opening 21.

In the example shown in FIG. 1, the filter housing 2 is equipped in its outer skin 23 with a housing opening 24, which is shaped in a complementary manner to the end disc 15. The shape of the housing opening 24 is adapted here to the shape of the end disc 15, such that the end disc 15 closes the housing opening 24 in a sufficiently tight manner, when the filter element 3 is inserted correctly into the filter housing 2. In particular, a corresponding seal can be provided for this between the housing 2 and the end disc 15. In so far as the end disc 15, which is equipped with the alignment contour 16, closes the housing opening 24, the alignment counter-contour 19 is arranged in the region of the housing opening 24. In particular, the alignment counter-contour 19 can be formed integrally on the filter housing 2. For example, the filter housing 2 can be formed by a single-piece and multiple-piece injection moulded component.

In far as—as here—several housing parts 26, 27 or respectively shell bodies 26, 27 are provided, an opening rim 28, which surrounds the housing opening 24 in a closed manner in the circumferential direction, can have a U-shaped profile, which is open radially and into which an outer rim 29 of the end disc 15 or of the cover 22, if the latter projects radially over the end disc 15, engages radially. In the example, two circumferential sections 30, 31 are provided, which extend respectively over approximately 180°, which respectively carry the U-profile and which are constructed respectively on one of the shell bodies 26, 27.

In an alternative embodiment, the filter housing 2 can be designed so that it completely surrounds the filter element 3. The alignment counter-contour 19 is then constructed in the interior of the housing 2, wherein also an integral forming of the alignment counter-contour 19 on the filter housing 2 is also possible there.

On the clean side of the filter housing 2, an air-flow sensor 25 can be arranged, with the aid of which, in operation of the fresh air system, the quantity of fresh air flowing in the fresh air system can be ascertained. In particular, such an air-flow sensor 25 is a hot film sensor. The air-flow sensor 25 can be arranged here downstream of the filter housing 2 in the fresh air system. However, an embodiment is particularly expedient in which the air-flow sensor 25 is arranged directly on the filter housing 2 and in particular also is fastened to the filter housing 2. Hereby, the air-flow sensor 25 is positioned comparatively close to the filter element 3, so that the relative rotational position of the filter element 3 with respect to the housing 2 and thereby with respect to the air-flow sensor 25 can be significant. Through the predetermined correlation between the alignment contour 16 and the end folds 10, in connection with the predetermined position of the alignment counter-contour 19 and in connection with the positioning which is provided of the air-flow sensor 25 with respect to the filter housing 2, an identical relation is always produced between the end folds 10 and the air-flow sensor 25. Hereby, it is possible on the one hand to select the position of the end folds 10 in the filter housing 2 so that their influence on the flow reaching the air-flow sensor 25 is reduced or is negligible. On the other hand, it is likewise possible to previously adjust the air-flow sensor 25 to the predetermined installation position of the end folds 10. This adjustment can be carried out e.g. already before the mounting of the air-flow sensor 25 on a reference structure, in which the end folds 10 have the desired target position with respect to the housing 2 and therefore with respect to the air-flow sensor 25.

The invention claimed is:

1. A filter element of a fresh air system of an internal combustion engine, comprising:
   an annular filter body having a folded filter material,
   at least one end disc fastened to an axial end face of the filter body on the filter material,
   the filter material having two end folds adjacent in the circumferential direction and fastened to each other,
   wherein the at least one end disc has at least one alignment contour protruding at least one of radially and axially from a respective one of the at least one end disc, the at least one alignment contour further being arranged on the respective one of the at least one end disc to produce a rotational position relationship between the alignment contour and the end folds such that an angle is formed between the at least one alignment contour and the end folds, the angle lying within an angle range having a maximum limit of twenty degrees.

2. The filter element according to claim 1,
   wherein the alignment contour is formed by an alignment projection protruding at least one of radially and axially outwards from the respective one of the at least one end disc.

3. The filter element according to claim 1,
   wherein the alignment contour is formed integrally on the respective one of the at least one end disc.

4. The filter element according to claim 1,
   wherein the end folds are fastened to each other by at least one clip, and
   wherein the at least one clip consists of metal.

5. An air filter for a fresh air system of an internal combustion engine, comprising:
   a filter housing having a filter element configured to separate a raw side from a clean side of the filter housing, wherein the filter element has an annular filter body with two end folds adjacent in the circumferential direction and fastened to each other,
   at least one end disc fastened to an axial end face of the filter body, wherein the at least one end disc has at least one alignment contour protruding at least one of radially and axially from a respective one of the at least one end disc, the at least one alignment contour further being arranged on the respective one of the at least one end disc to produce a rotational position relationship between the alignment contour and the end folds such that an angle is formed between the at least one alignment contour and the end folds, the angle lying within an angle range having a maximum limit of twenty degrees,
   wherein the filter housing has at least one alignment counter-contour configured in a complementary manner to the alignment contour of the filter element and cooperates therewith so that the filter element is only able to be inserted in a predetermined rotational position with respect to its longitudinal central axis.

6. The air filter according to claim 5,
   wherein an air-flow sensor is arranged on the clean side of the filter housing, and
   wherein the air-flow sensor is at least one of arranged on and arranged in the filter housing and is fastened to the filter housing.

7. The air filter according to claim 5,
   wherein the filter housing completely surrounds the filter element.

8. The air filter according to claim 5,
   wherein the filter element is at least one of a closed end disc and an open end disc having an opening, the opening being shut by a cover, the cover configured to close a housing opening defined by the filter housing when the filter element is inserted correctly into the filter housing.

9. The air filter according to claim 8,
   wherein the alignment counter-contour is arranged in the region of the housing opening, and
   wherein the alignment counter-contour is formed integrally on the filter housing.

10. The air filter according to claim 6, wherein the filter housing completely surrounds the filter element.

11. The air filter according to claim 10, wherein the filter element is at least one of a closed end disc and an open end disc having an opening, the opening being shut by a cover, the cover configured to close a housing opening defined by the filter housing when the filter element is inserted correctly into the filter housing.

12. The air filter according to claim 6, wherein the filter element is at least one of a closed end disc and an open end disc having an opening, the opening being shut by a cover, the cover configured to close a housing opening defined by the filter housing when the filter element is inserted correctly into the filter housing.

13. The filter element according to claim 1, wherein the alignment contour is formed by an alignment projection protruding at least one of radially and axially outwards from the respective end disc.

14. The filter element according to claim 13, wherein the alignment contour is formed integrally on the respective one of the at least one end disc.

15. The filter element according to claim 14, wherein the end folds are fastened to each other by at least one clip, and wherein the at least one clip consists of metal.

16. The filter element according to claim 1, wherein the end folds are fastened to each other by at least one clip, and wherein the at least one clip consists of a magnetically detectable metal.

17. The filter element according to claim 1, wherein the at least one alignment contour comprises at least two alignment contours arranged in a non-rotationally symmetrical pattern.

18. The filter element according to claim 17, wherein the at least two alignment contours have at least one of different dimensions and different geometries.

19. A filter element of a fresh air system of an internal combustion engine, comprising:
   an annular filter body having a folded filter material; and
   at least one end disc fastened to an axial end face of the filter body on the filter material having two end folds adjacent in the circumferential direction and fastened to each other;
   wherein the at least one end disc has at least one alignment contour formed by an alignment projection protruding radially and axially from a respective one of the at least one end disc; and
   wherein the alignment contour and the end folds have a rotational position relationship defining an angle between the alignment contour and the end folds that is within a predetermined angle range having a maximum limit of twenty degrees.

* * * * *